United States Patent
Mullen et al.

(10) Patent No.: US 8,666,865 B2
(45) Date of Patent: *Mar. 4, 2014

(54) PAYMENT ENTITY ACCOUNT SET UP FOR MULTIPLE PAYMENT METHODS

(71) Applicant: Visa U.S.A. Inc., San Francisco, CA (US)

(72) Inventors: Matthew James Mullen, Danville, CA (US); John Nicholas Marchetti, Monrovia, MD (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,949

(22) Filed: Sep. 26, 2012

(65) Prior Publication Data

US 2013/0117178 A1    May 9, 2013

Related U.S. Application Data

(63) Continuation of application No. 12/030,785, filed on Feb. 13, 2008, now Pat. No. 8,311,913, which is a continuation-in-part of application No. 11/929,033, filed on Oct. 30, 2007, now Pat. No. 8,407,141.

(51) Int. Cl.
*G06Q 40/00*        (2012.01)
*G06Q 40/02*        (2012.01)

(52) U.S. Cl.
CPC ...................................... *G06Q 40/02* (2013.01)
USPC ............... 705/35; 709/724; 705/44; 705/39; 705/30; 705/40; 705/42; 455/41.1; 235/375

(58) Field of Classification Search
USPC ............. 709/724; 705/44, 35, 39, 30, 40, 42; 455/41.1; 235/375
See application file for complete search history.

(56) References Cited

U.S. PATENT DOCUMENTS 5,717,868 A    2/1998    James
5,790,677 A    8/1998    Fox et al.

(Continued)

FOREIGN PATENT DOCUMENTS

WO    2006/124808 A1    11/2006

OTHER PUBLICATIONS

American Express, S2S eInvoice & Pay, "The automated invoice and payment solution that drives efficiencies and cost savings", EIPSFactSheet-0707, retrieved from internet Feb. 2008, 2 pages, http://corp.americanexpress.com/gcs/s2s/einvoicepay/docs/S2S_eInvoicePay-Factsheet.pdf.

(Continued)

*Primary Examiner* — Tien Nguyen
(74) *Attorney, Agent, or Firm* — Kilpatrick Townsend & Stockton LLP

(57) ABSTRACT

A method begins with a payment entity device receiving payables process data from a client device. The payables process data includes a list of a plurality of creditors and associated payment data, wherein, for a creditor of the plurality of creditors, the associated payment data includes at least one payment scheme for paying at least a portion of debt owed to the creditor via at least one of: a client credit card, a funds transfer, commercial paper, tangible consideration, and a debit account. The method continues with the payment entity device determining level of service for a client associated with the client device. The method continues with the payment entity device generating a payables profile for the client based on the payables process data in accordance with the level of service.

21 Claims, 11 Drawing Sheets

(56) References Cited

U.S. PATENT DOCUMENTS

| | | | |
|---|---|---|---|
| 5,826,241 A | 10/1998 | Stein et al. | |
| 5,850,446 A | 12/1998 | Berger | |
| 5,873,072 A | 2/1999 | Kight | |
| 5,898,777 A | 4/1999 | Tycksen et al. | |
| 5,956,695 A | 9/1999 | Carrithers et al. | |
| 6,012,048 A | 1/2000 | Gustin et al. | |
| 6,032,133 A | 2/2000 | Hilt et al. | |
| 6,208,973 B1 | 3/2001 | Boyer et al. | |
| 6,292,789 B1 | 9/2001 | Schutzer | |
| 6,304,860 B1 | 10/2001 | Martin et al. | |
| 6,308,887 B1 | 10/2001 | Korman et al. | |
| 6,366,893 B2 | 4/2002 | Hannula et al. | |
| 6,408,284 B1 | 6/2002 | Hilt et al. | |
| 6,609,113 B1 | 8/2003 | O'Leary et al. | |
| 6,611,818 B1 | 8/2003 | Mersky et al. | |
| 6,704,714 B1 | 3/2004 | O'Leary et al. | |
| 6,932,268 B1 | 8/2005 | McCoy et al. | |
| 6,996,542 B1 | 2/2006 | Landry | |
| 6,999,943 B1 | 2/2006 | Johnson et al. | |
| 7,003,495 B1 | 2/2006 | Burger et al. | |
| 7,031,940 B2 | 4/2006 | Shigemi et al. | |
| 7,058,611 B2 | 6/2006 | Kranzley et al. | |
| 7,103,579 B1 | 9/2006 | Phillips et al. | |
| 7,124,937 B2 | 10/2006 | Myers et al. | |
| 7,156,294 B2 | 1/2007 | Roth | |
| 7,269,575 B1 | 9/2007 | Concannon et al. | |
| 7,290,704 B1 | 11/2007 | Ball et al. | |
| 7,313,545 B2 | 12/2007 | Degen et al. | |
| 7,321,874 B2 | 1/2008 | Dilip et al. | |
| 7,536,351 B2 * | 5/2009 | Leblang et al. | 705/40 |
| 7,792,712 B2 | 9/2010 | Kantarjiev et al. | |
| 7,792,717 B1 * | 9/2010 | Hankins et al. | 705/35 |
| 7,860,789 B2 * | 12/2010 | Hirka et al. | 705/39 |
| 7,930,248 B1 | 4/2011 | Lawson et al. | |
| 8,204,826 B2 * | 6/2012 | Banaugh et al. | 705/40 |
| 2001/0034702 A1 | 10/2001 | Mockett et al. | |
| 2001/0037209 A1 | 11/2001 | Tarbutton et al. | |
| 2002/0023053 A1 | 2/2002 | Szoc et al. | |
| 2002/0032653 A1 | 3/2002 | Schutzer | |
| 2002/0087344 A1 | 7/2002 | Billings et al. | |
| 2002/0111886 A1 | 8/2002 | Chenevich et al. | |
| 2002/0111915 A1 | 8/2002 | Clemens et al. | |
| 2002/0111916 A1 | 8/2002 | Coronna | |
| 2002/0116331 A1 * | 8/2002 | Cataline et al. | 705/39 |
| 2002/0152124 A1 | 10/2002 | Guzman et al. | |
| 2002/0194138 A1 | 12/2002 | Dominguez et al. | |
| 2003/0055792 A1 | 3/2003 | Kinoshita et al. | |
| 2003/0088462 A1 | 5/2003 | Carrithers et al. | |
| 2003/0195819 A1 | 10/2003 | Chen et al. | |
| 2003/0216996 A1 | 11/2003 | Cummings et al. | |
| 2004/0117302 A1 * | 6/2004 | Weichert et al. | 705/40 |
| 2004/0128240 A1 | 7/2004 | Yusin | |
| 2004/0143527 A1 | 7/2004 | Benkert et al. | |
| 2004/0215560 A1 * | 10/2004 | Amalraj et al. | 705/40 |
| 2004/0230526 A1 | 11/2004 | Praisner | |
| 2005/0033609 A1 | 2/2005 | Yang | |
| 2005/0049974 A1 | 3/2005 | Jani et al. | |
| 2005/0096011 A1 | 5/2005 | Yoshida et al. | |
| 2005/0119918 A1 * | 6/2005 | Berliner | 705/3 |
| 2005/0177494 A1 | 8/2005 | Kelly et al. | |
| 2005/0184145 A1 | 8/2005 | Law et al. | |
| 2006/0015459 A1 * | 1/2006 | Enenkiel | 705/40 |
| 2006/0068897 A1 | 3/2006 | Sanford et al. | |
| 2006/0074799 A1 * | 4/2006 | Averyt et al. | 705/40 |
| 2006/0173779 A1 * | 8/2006 | Bennett et al. | 705/40 |
| 2006/0178986 A1 | 8/2006 | Giordano et al. | |
| 2006/0206425 A1 | 9/2006 | Sharma | |
| 2006/0265298 A1 | 11/2006 | Lee et al. | |
| 2006/0266821 A1 | 11/2006 | Zajkowski et al. | |
| 2007/0016526 A1 | 1/2007 | Hansen et al. | |
| 2007/0038560 A1 * | 2/2007 | Ansley | 705/39 |
| 2007/0067239 A1 | 3/2007 | Dheer et al. | |
| 2007/0124224 A1 | 5/2007 | Ayers et al. | |
| 2007/0136140 A1 | 6/2007 | Smith | |
| 2007/0150411 A1 | 6/2007 | Addepalli et al. | |
| 2007/0168234 A1 | 7/2007 | Rutkowski et al. | |
| 2007/0198277 A1 | 8/2007 | Philipp et al. | |
| 2007/0255669 A1 | 11/2007 | Kashanov | |
| 2007/0282743 A1 | 12/2007 | Lovelett et al. | |
| 2007/0288377 A1 | 12/2007 | Shaked | |
| 2008/0010204 A1 | 1/2008 | Rackley, III et al. | |
| 2008/0011825 A1 | 1/2008 | Giordano et al. | |
| 2008/0015985 A1 * | 1/2008 | Abhari et al. | 705/42 |
| 2008/0033878 A1 | 2/2008 | Krikorian et al. | |
| 2008/0086417 A1 | 4/2008 | Bykov | |
| 2008/0109352 A1 | 5/2008 | Csoka | |
| 2008/0133407 A1 * | 6/2008 | Guillory et al. | 705/40 |
| 2008/0154769 A1 | 6/2008 | Anderson et al. | |
| 2008/0162341 A1 | 7/2008 | Zimmer et al. | |
| 2008/0235101 A1 | 9/2008 | Piepenbrink et al. | |
| 2009/0063353 A1 | 3/2009 | Viidu et al. | |
| 2009/0076953 A1 | 3/2009 | Saville et al. | |
| 2009/0076954 A1 | 3/2009 | Carmody et al. | |

OTHER PUBLICATIONS

Mastercard Advisors, Purchase Logic™, 2 pages.

Mastercard Worldwide, Payment Gateway, "When was the last time somebody referred to accounts payable as "A well-oiled machine"?", MPG-Buyer 01; retrieved from internet Feb. 2008, 2 pages, https://www.mastercardpaymentgateway.com/mpgpublic/pdf/buyers_sell_sheet.pdf.

Mastercard Worldwide, Payment Gateway, "There may be no shortcuts to success. But there is one to getting paid.", MPG-Supplier 0-1; retrieved from internet Feb. 2008, 2 pages, https://www.mastercardpaymentgateway.com/mpgpublic/pdf/supplier_sell_sheet.pdf.

"GreenZap Building Payment Gateway to Deliver Instant Transactions," Business Wire, Oct. 12, 2005.

"Payment Data Systems, Inc. Announces Credit Card Gateway Services for Billers and Merchants," PR Newswire, Nov. 3, 2003.

"Country Survey—Russia: Russia's Payment Industry Catches Up," Electronic Payments International, Dec. 31, 2006.

Notice of Allowance in U.S. Appl. No. 13/627,941, 7 pages.

Notice of Allowance mailed Aug. 30, 2013 in U.S. Appl. No. 13/653,350, 13 pages.

\* cited by examiner

Payable Profile 140

| Creditor | AP type | Payment Method | Payment Terms | Financial Inst. |
|---|---|---|---|---|
| Supplier ABC | Price ≥ X | credit card | net 30 | Bank "A" |
| | Goods – Category 1 | line of credit | - | Bank "A" |
| Supplier B | All | wire transfer | per AP | Bank "A" |
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" |
| Supplier D | All for date 1 through date 2 | promissory note | - | VC "1" |
| | All goods/services after date 2 | credit card | net 30 | Bank "A" |
| | pay note | check | net 15 | Bank "B" |
| | Goods – Category "a" | account credit | - | - |
| Supplier E | All others | credit card | net 45 | Bank "B" |

FIG. 5

Payable Profile 140

| Creditor | AP type | Payment Method | Payment Terms | Financial Inst. |
|---|---|---|---|---|
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" | accounts payable data file 150

| Supplier | Invoice # | Item | Qty | Unit $ | Subtotal | Tax | S&H | Total | Alt. pay method |
|---|---|---|---|---|---|---|---|---|---|
| DEF | 2001 | AAA | 12 | $33.30 | $399.60 | $33.30 | $75.50 | $508.40 | check, net-45 |
| | 2002 | XXX | 12 | $3.33 | $39.96 | $3.30 | $7.50 | $50.76 | no |
| | 2003 | zzz | 10 | $3.00 | $30.00 | $3.00 | $7.50 | $43.50 | no |
| | 2004 | mmm | 1 | $300.00 | $300.00 | $30.00 | $75.50 | $435.50 | no |
| Totals: | | | | | $769.56 | $69.60 | $166.00 | $1,038.16 | | payment data 152 for Supplier DEF

| Invoice # | Invoice Date | Item | AP type | Total | Payment Method | Payment Terms | Financial Inst. | Payment Date |
|---|---|---|---|---|---|---|---|---|
| 2001 | 1/1/08 | AAA | Services – Category 1 | $508.40 | *check* | *net 45* | *Bank "B"* | *2/15/08* |
| 2002 | 1/2/08 | XXX | Services – Category 2 | $50.76 | check | net 30 | Bank "B" | 2/2/08 |
| 2003 | 1/3/08 | ZZZ | Goods – Category I | $43.50 | credit card | per AP | Bank "C" | today |
| 2004 | 1/4/08 | mmm | Goods – Category II | $435.50 | tangible consid. | - | Entity "A" | 1/19/08 |
| | | loan | loan payment | $500.00 | wire | - | Bank "A" | today |

FIG. 7

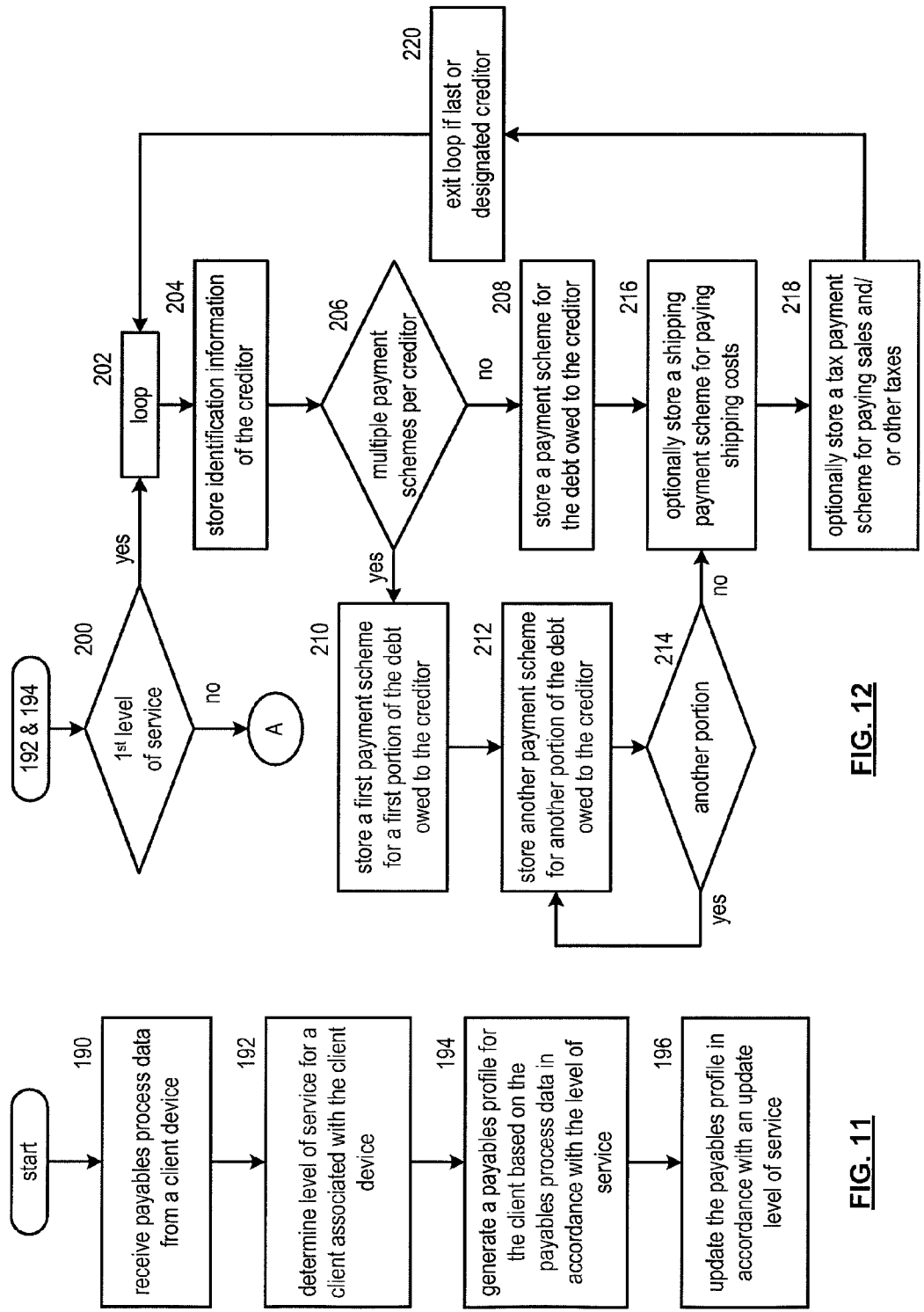

PAYMENT ENTITY ACCOUNT SET UP FOR MULTIPLE PAYMENT METHODS

CROSS-REFERENCE TO RELATED PATENTS

This patent application is a continuation of U.S. patent application Ser. No. 12/030,785, filed on Feb. 13, 2008, which is a continuation-in-part of U.S. patent application Ser. No. 11/929,033, filed on Oct. 30, 2007, all of which are herein incorporated by reference in their entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communication systems and more particularly to financial transactions communication systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

Regardless of the type of credit card transaction processing system, such systems provides consumers, whether individuals, small companies, or large corporate entities, an easy mechanism for paying for goods and/or services. For instance, many businesses use credit cards to purchase goods and/or services from a variety of suppliers as part of their procurement and payment processes. While businesses use credit cards to purchase goods and services, they also use other forms of payment as part of their procurement and payment processes. For example, a business may purchase goods and/or services using a check, a wire transfer, and/or an automated clearing house (ACH) debit account.

Software programs have been developed to assist businesses with their procurement and payment processes. Such software programs include provisions for tracking inventory, generating purchase orders, requesting invoices, and initiating and tracking payments for the desired goods and/or services. Once a payment is initiated, depending on the type of payment, it is processed outside of the software via the appropriate system. For example, a credit card transaction is processed as discussed above. After the payment is made, it is reconciled and the reconciled payment information is provided back to the business, or to its software. While this approach reduces the burdens on a business to purchase and pay for goods and/or services, it still requires a fair amount of input from the business to initiate payments, track them, and process the reconciled data.

Recently, proprietary transaction processing network providers have partnered with procurement and payment software entities to further reduce the burdens of a business by integrating the procurement and payment software with credit card payment processing. Such integration provides relatively seamless payment for goods and/or services being purchased with a credit card. Further, in a single issuer system, the system is capable of processing payments made via a check or an ACH debit account. As such, in a single issuer system, check payments and/or ACH debit account payments may be offered to the business.

While such advancements are reducing the payment and tracking burdens of a business, they are still somewhat disjointed, still require additional business involvement, and require involvement of the supplier financial chain (e.g., merchant, merchant's bank, etc.). For instance, in the integrated credit card payment system, the business still needs to process transactions using other forms of payment, which involves the supplier financial chain. In the single issuer system, the business is limited to using a credit card issued by the provider of the single issuer system, which dramatically limits payments options.

Therefore, a need exists for a method and apparatus that provides for seamless payment for goods and/or services regardless of the type of payment and/or the type of proprietary transaction processing network.

BRIEF DESCRIPTION OF THE SEVERAL VIEWS OF THE DRAWINGS

FIG. 5 is a diagram of an example of a payables profile in accordance with the present invention;

FIG. 7 is a diagram of an example of creating payment data from a payables profile and an accounts payable data file in accordance with the present invention;

FIG. 11 is a logic diagram of an embodiment of a method for generating and updating a payables profile in accordance with the present invention;

FIGS. 12 and 13 are a logic diagram of another embodiment of a method for generating updating a payables profile in accordance with the present invention.

DETAILED DESCRIPTION OF THE INVENTION

Figure 1:
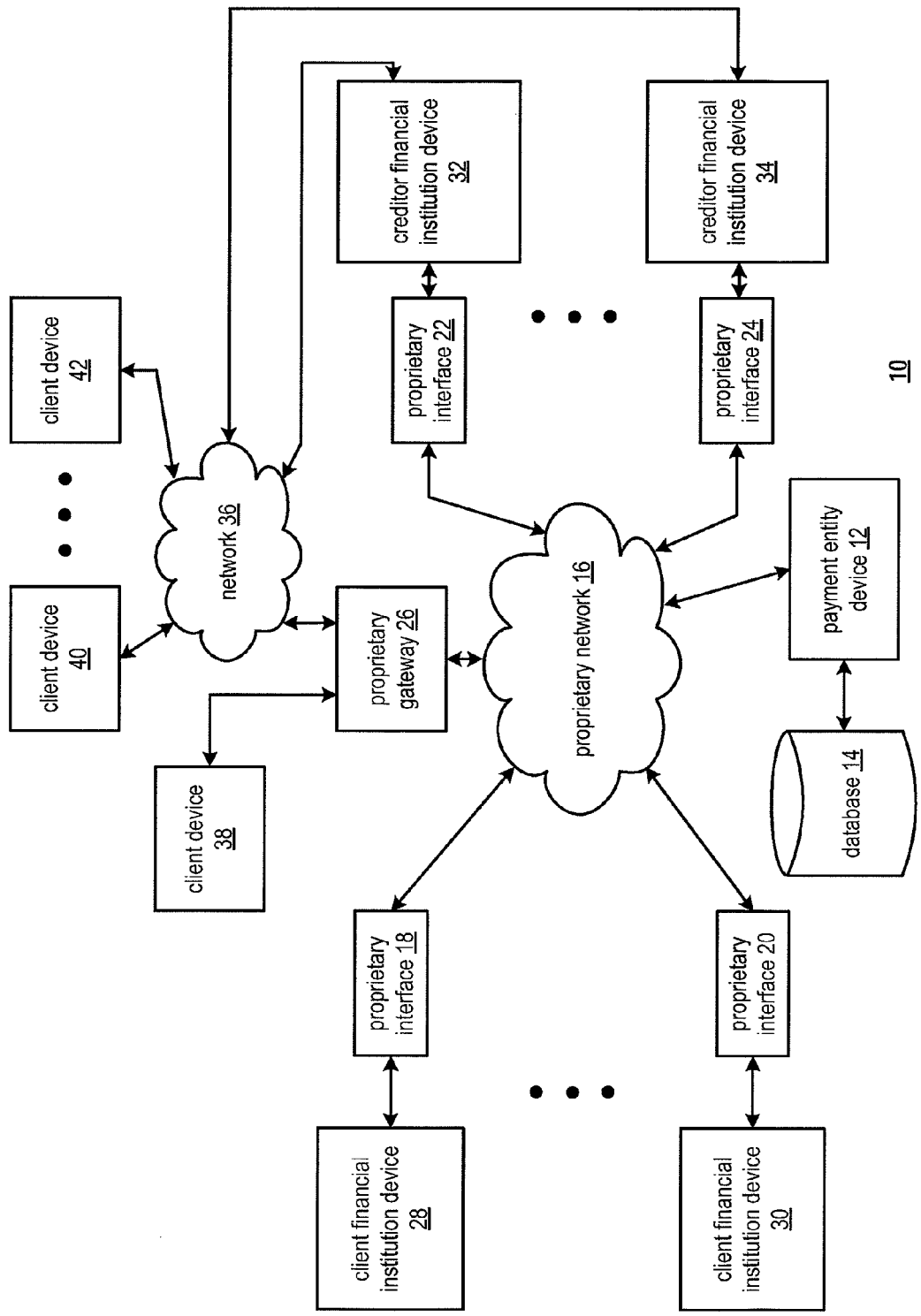
FIG. 1 is a schematic block diagram of an embodiment of a system in accordance with the present invention.

FIG. 1 is a schematic block diagram of an embodiment of a system 10 that includes a payment entity device 12, a database 14, a proprietary transaction processing network 16, a plurality of proprietary interfaces 18-24, a proprietary gateway 26, a plurality of client financial institution devices 28-30, a plurality of creditor financial institution devices 32-34, a network 36 (e.g., the internet), and a plurality of client devices 38-42.

The payment entity device 12, the database 14, and the proprietary network 16 may be operated and maintained by a single entity to facilitate seamless payment and reconciliation of accounts payable regardless of the payment method on behalf of one or more clients (e.g., individuals, businesses, agencies, and/or other entities). For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto.

In general, a client, via its device 38-42, establishes an account with the payment entity (e.g., Visa, Inc.), via its device 12. The account includes a level of service (basic, level 1, etc.), identity of the client and its device 38-42, and a payables profile. The payables profile includes a list of creditors (suppliers, merchants, service providers, etc.) of the client, identification information of the creditors, and one or more preferred methods of paying debt owed to a creditor.

With the account established, the payment entity is ready to provide payment and reconciliation support for the client. This function commences when the client, via its device 38-42, provides an accounts payable data file to the payment entity device 12 via the proprietary gateway 26 (and optionally the network 36) and the proprietary network 16. The proprietary gateway 26 is a proprietary node, modem, bridge, etc., that serves as a connection point to the proprietary network 16, which ensures that only authorized entities have access to the proprietary network 16. Note that communications within the system 10 occur in accordance with the communication protocol (e.g., internet protocol, transmission control protocol, and/or a proprietary version thereof) of the proprietary network 16.

Upon receiving the accounts payable data file, the payment entity device 12 retrieves the payables profile of the client, which may be stored in the database 14. The payment entity device 12 determines a method of payment (e.g., credit card [e.g., credit card, debit card, charge card, stored-value card, prepaid card, Electronic Benefit Transfer card, card account and other types of issued cards or accounts], funds transfer [e.g., wire transfer, account transfer within same financial institution, etc.], commercial paper [e.g., check, promissory note, etc.], tangible consideration [e.g., rebate, refund, goods and/or service exchange, etc.], debit account [e.g., ACH, line or credit, etc.], and credit card [e.g., business, debit card, auto pay, single use, etc.]), amount of payment, payment date, and terms of payment for each account payable in the accounts payable data file based on the payables profile. Alternatively, for an account payable, the payment entity device 12 may determine a different method of payment that is more optimal (e.g., less costly to process, better payment terms, rebate offer, rewards offer, etc.) for the client.

For a given account payable, the payment entity device 12 initiates a payment on behalf of the client in accordance with the method of payment, the amount of payment, the payment date, and the payment terms by sending a payment request to a client financial institution device 28-30 that corresponds to the type of payment (e.g., issuer bank for a credit card payment, a bank for check payment, a bank for wire transfer, etc., which may be the same or different banks).

The client financial institution device 28-30 processes the payment request in accordance with the type of payment. For example, if the type of method is a credit card payment, the client financial institution device 28-30 assists in the clearing and settlement process with the creditor's financial institution device 32-34. As another example, if the type of payment is a check, the client financial institution device 28-30 determines whether the client has sufficient funds in its account to cover the amount due. If yes, the client financial institution device 28-30 generates a check, sends it to the creditor, and generates a transaction completed message, which includes the check number, amount, creditor, payment date, etc. The client financial institution device 28-30 sends the transaction complete message to the payment entity device 12.

The payment entity device 12 monitors the payments of the accounts payable, collects the payment responses from the various financial institution devices 28-30 and 32-34, reconciles payments of the accounts payable, and generates reports thereof. As an example, the payment entity device 12 generates a client statement report that indicates how and when the accounts payable have been paid. In this manner, the client, after setting up an account, merely transmits an accounts payable data file to the payment entity device 12 and receives a statement when the accounts are paid, with little or no interaction to facilitate the payments regardless of the payment type.

Figure 2:
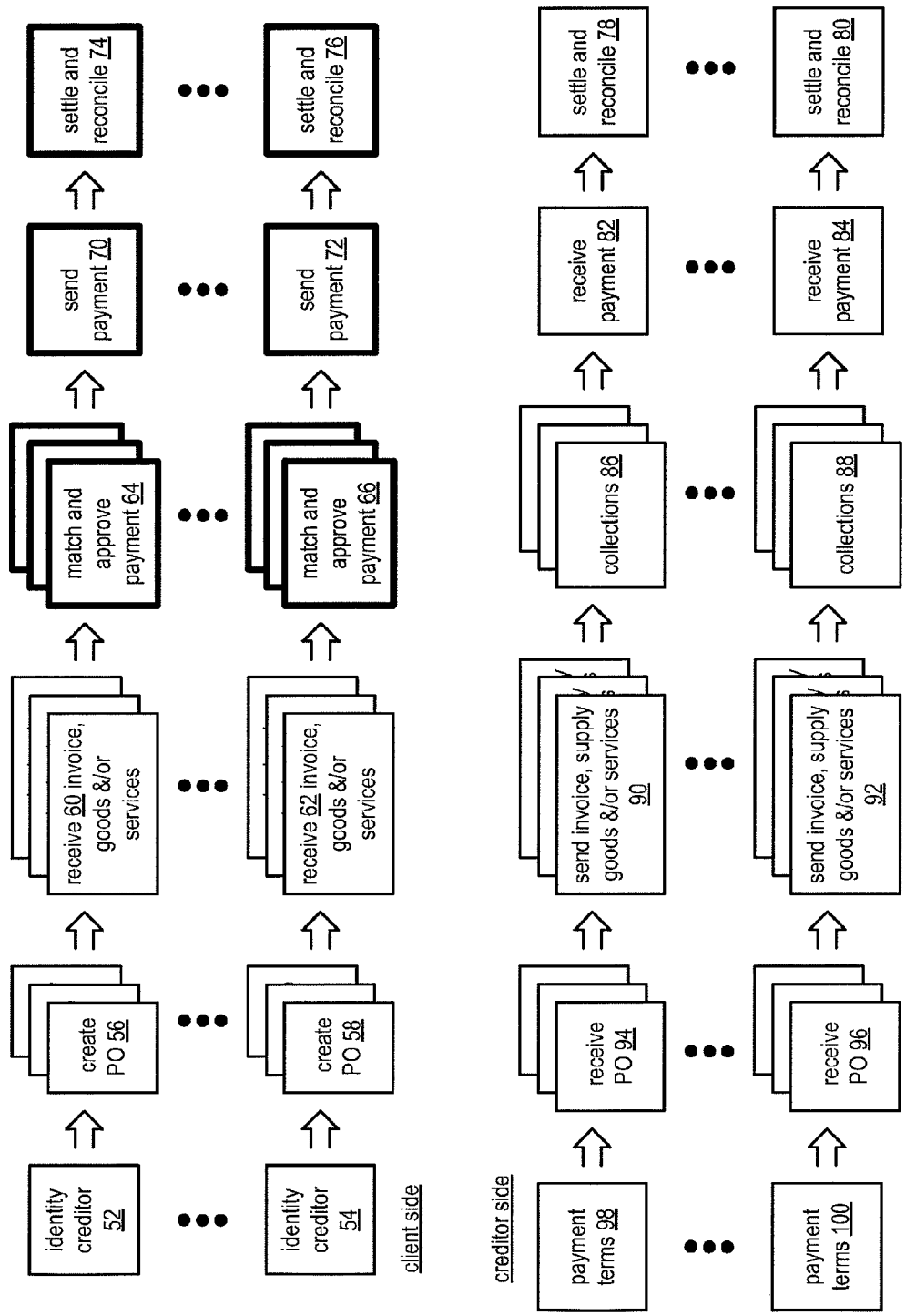
FIG. 2 is a diagram of an example of a payment and procurement process in accordance with the present invention.

FIG. 2 is a diagram of an example of a payment and procurement process that includes a client side and a creditor side. The client side includes identifying creditors (e.g., supplier, service provider, merchant, loan service, line of credit service, etc.) 52-54, creating purchase orders (PO) 56-58, receiving invoice for goods and/or services 60-62 per purchase order, match and approve payment 64-66 per purchase order, send payment 70-72 per purchase order or creditor, and settle and reconcile 74-76 each payment. The creditor side includes establish payment terms 98-100 for a client, receive purchase orders 94-96, send invoice for goods and/or services 90-92, generate collections (e.g., accounts receivable) 86-88, receive payments 82-84 for each purchase order or from a given client, and settle and reconcile payments 78-80. Note that the system of FIG. 1 supports the match and approve payment step 64-66, the send payment step 70-72, and/or the settle and reconcile step 74-76.

Figure 3:
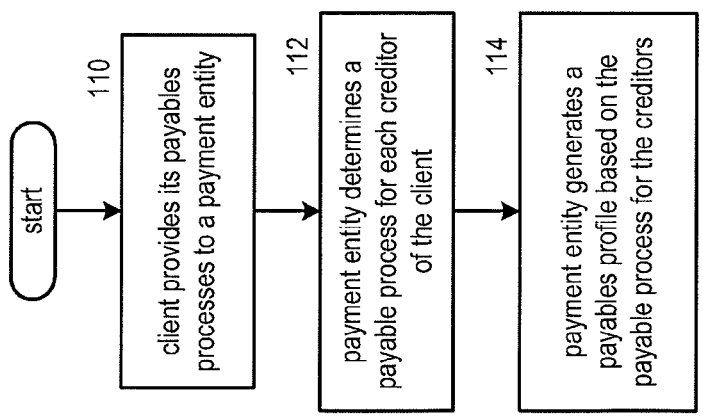
FIG. 3 is a logic diagram of an embodiment of a method for creating a payables profile in accordance with the present invention.

FIG. 3 is a logic diagram of an embodiment of a method for creating a payables profile that begins at step 110 where a client device 38-42 provides the client's payable processes to the payment entity device 12. The client's payables processes include identity of a creditor and, for each creditor, one or more preferred methods of payment (e.g., credit card, funds transfer, commercial paper, tangible consideration, debit account, and credit card), preferred payment terms, and identity of client's corresponding financial institution. Note that the client's payables processes may include more or less data. Further note that client's payables processes may include default information. For example, the default information may indicate a particular payment type for any non-specified creditor, may indicate a particular payment type for certain types of transactions regardless of creditor, may indicate a particular payment type for transactions greater than a certain value and another for transactions less than the certain value, may indicate, for a given payment type, to use a particular client financial institution, and/or may indicate to have the payment entity device to determine the payment method and/or client financial institution. As such, the client can provide as specific or as vague of guidelines as it desires as to how, when, and in what way its debts are to be paid.

The method then proceeds to step 112 where the payment entity determines a payables process for each creditor of the client based on the client's payables processes. For example, if the client provided a specific payables process for a specific creditor, then the payment entity stores this information for the specific creditor. As another example, if the client did not provide a specific payables process for a creditor, the payment entity may assign the default payment process or a payment entity identified payment process for the creditor. The method then proceeds to step 114 where the payment entity generates a payables profile for the client based on the payables processes for the creditors.

Figure 4:
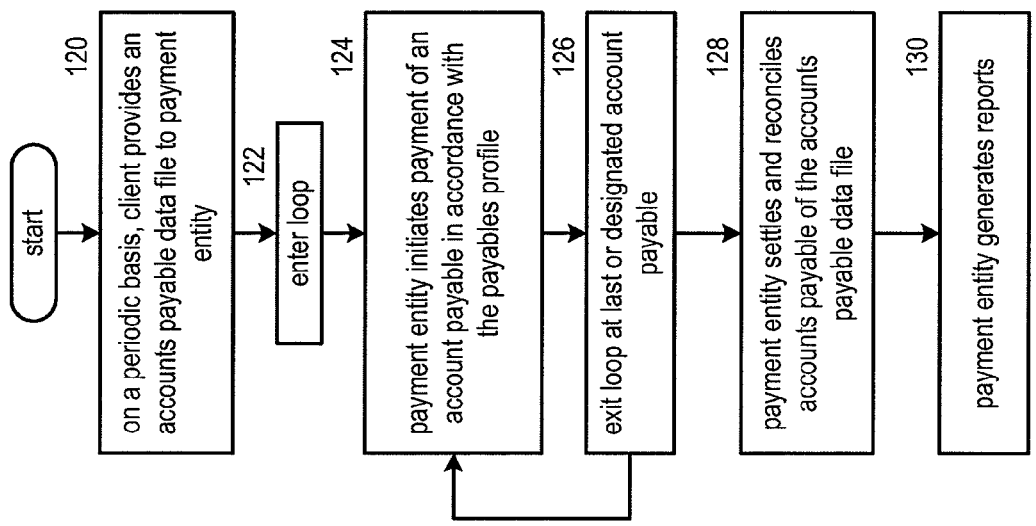
FIG. 4 is a logic diagram of an embodiment of a method for paying accounts payable in accordance with the present invention.

FIG. 4 is a logic diagram of an embodiment of a method for paying accounts payable that begins at step 120 where, on a periodic basis (e.g., weekly, bi-monthly, monthly, when initiated by the client), the client device 38-42 provides an accounts payable data file to the payment entity device 12. In an embodiment, the accounts payable data file includes, at a minimum, invoices from creditors of the client. The invoices may be arranged into a tabular form, or other form, and sorted based on creditor, item purchased, dollar amount, method of payment, and/or any other data point.

The method continues at step 122, where the payment entity device 12 enters a loop. Within the loop, the payment entity device 12 initiates a payment of an account payable in accordance with the payables profile at step 124. For example, for a given accounts payable, which may correspond to a single invoice from a given creditor or a group of invoices from the creditor, the payment entity device 12 accesses the payables profile with respect to the creditor. Based on the payment preferences specified in the payables profile, the payment entity device 12 generates a payment request and sends to the appropriate client financial institution. The payment entity device 12 remains in the loop unit the last or a designated account payable is reached at step 126. For example, the designated account payable may correspond to a cumulative total of payments being exceeded, a certain number of creditors, etc. Note that the payment initiation is being done without involvement of the creditor's financial institution as is typical in credit card transactions.

The method then continues at step 128 where the payment entity device settles and reconciles the accounts payable. For example, the payment entity device 12 receives payment notifications from the client's financial institutions, stores the payment notifications, and reconciles the payment notifications with the accounts payable. The method then continues at step 130 where the payment entity device 12 generates reports regarding the payment of the accounts payable. The payment entity device 12 may generate a report for the client, for itself, for the client's financial institution(s), and/or the creditor's financial institution(s).

FIG. 5 is a diagram of an example of a payables profile 140 that includes a plurality of fields. The fields may include more or less of a creditor field, an accounts payable type field, a payment method field, a payment terms field, and a financial institution field. In an embodiment, the payment entity device 12 stores, for the creditors of the client, the preferred payment method, payment terms, and financial institution for various types of accounts payable. The preferences may be provided by the client without input from the payment entity, may include input from the payment entity, or derived by the payment entity.

As shown for a given creditor, accounts payable may be grouped and have different payment preferences. For example, Supplier ABC has two groupings of accounts payable type: the first being any goods and/or services that have a purchase price greater than a specified price and goods in category 1. The specified price could be a per-item price or a cumulative price. For goods and/or services that exceed this price, the preferred payment method is a credit card, which should be paid net-30 from the date of an invoice, and to use one or more of the credit cards the client has that is/are issued from Bank "A".

For goods that fall into category 1 (e.g., office supplies, etc.), the preferred method of payment is a line of credit with Bank "A". In the case where goods of category 1 are purchased and exceed the price threshold, a hierarchical approach may be applied to determine which payment method to use. For example, in this instance, use the first preferred method.

For all other goods and/or services that are not within category 1 and have a price less than the threshold, the payment entity device 12 will use a default payment approach. The client may specify the default method or the payment entity device 12 may determine the default method.

As another example, Supplier B has indicated that all of its accounts payables are to be paid using a wire transfer, with payment terms it specifies in the account payable data file, and the funds should come from Bank "A". As yet another example, Supplier DEF has numerous account payable categories, each with a different payment preference. As shown, services of category 1 are to be paid using a debit account, services of category 2 are to be paid using a check, goods of category 1 are to be paid using a credit card, goods of category 2 are to be paid with tangible consideration (e.g., a credit, exchange of goods and/or services, etc.), and a loan payment is to be made using a wire transfer.

As a further example, Supplier D has two classifications for its accounts payable: one for accounts payable incurred between a first and second date and a second for accounts payable incurred subsequent to the second date. In this example, all accounts payable incurred between the first and second dates are to be paid using a promissory note from a venture capitalist (VC) "1". For accounts payable incurred after the second date, a credit card is to be used. Also, payments on the promissory note are to be made using a check from an account with Bank "B".

Figure 6:
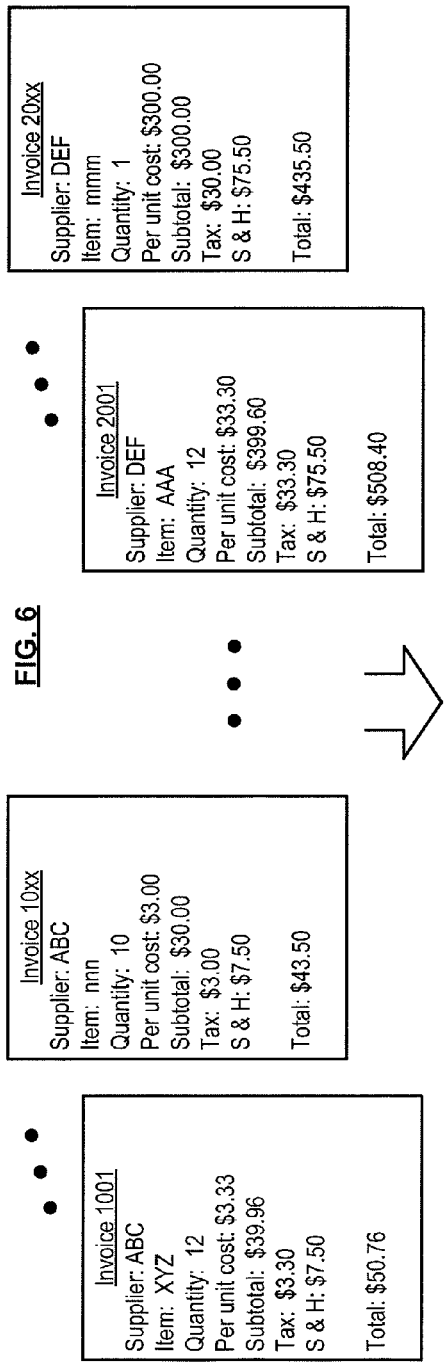
FIG. 6 is a diagram of an example of an accounts payable data file in accordance with the present invention.

FIG. 6 is a diagram of an example of an accounts payable data file 150 created from a plurality of invoices. In an embodiment, the invoices may stored and provided as the accounts payable data file 150. In another embodiment as shown, the invoices are tabulated to create the data file 150.

In this example, each invoice includes supplier identification information (e.g., name, address, creditor's financial institution, etc.), the items purchased, the quantity of items purchased, the unit cost of the items purchased, a subtotal, taxes, shipping and handling, and a total. On a per creditor basis, or some other basis (e.g., amount, item, etc.), the data is tabulated. In addition, the accounts payable data file may include an additional field to indicate with a particular account payable is to be paid in accordance with the payable profile or with an alternate payment process. In this example, invoice 2001 is to be paid using a check with a net-45 payment term.

FIG. 7 is a diagram of an example of creating payment data 152 from a payables profile 150 and an accounts payable data file 140 for a given creditor (e.g., supplier DEF). The payables profile 140 is a repeated from FIG. 5 for Supplier DEF and the account payable data file 150 is repeated from FIG. 6 for Supplier DEF with the addition of invoices 2002 and 2003. From these two data files, the payment entity device 12 generates the payment data 152, which is used to create payment requests that are sent to the appropriate financial institutions of the client.

For example, with respect to invoice 2001, the processing entity device 12 reviews the accounts payable data file 150 for this invoice to identify the invoice date, the item purchased, the purchase price, tax, shipping & handling, and if an alternate payment method is indicated. In this instance, there is an alternate payment method. As such, for invoice 2001, the payment entity device 12 generates the payment data to include the invoice number (e.g., 2001), the invoice date (e.g., Jan. 1, 2008), the item (e.g., AAA), the account payable type (e.g., Services—Category 1), the total price (e.g., $508.40, assuming tax and shipping & handling costs are being paid along with the purchase prices and not being paid using a different payment method), the payment method (e.g., check per the accounts payable file instead of a debit account as indicated in the payables profile), the payment terms (e.g., net 45 per the accounts payable data file), the financial institution identity (e.g., Bank "B" per the accounts payable data file instead of Bank "A" per the payables profile), and the payment date (e.g., Feb. 15, 2008, 45 days from the invoice date).

As another example, with respect to invoice 2002, the processing entity device 12 reviews the accounts payable data file 150 for the relevant information. In this instance, there is no alternate payment method. As such, for invoice 2002, the payment entity device 12 generates the payment data to include the invoice number (e.g., 2002), the invoice date (e.g., Jan. 2, 2008), the item (e.g., XXX) the account payable type (e.g., Services—Category 2), the total price (e.g., $50.76, assuming tax and shipping & handling costs are being paid along with the purchase prices and not being paid using a different payment method), the payment method (e.g., check per payables profile), the payment terms (e.g., net 30 per the payables profile), the financial institution identity (e.g., Bank "B" per the payables profile), and the payment date (e.g., Feb. 2, 2008, 30 days from the invoice date).

The payment entity device 12 generates the payment data 152 for invoice 2003 and 2004 in a similar manner as it generated the payment data 152 for invoice 2001. Note that since the payables profile and the accounts payable data file did not indicate payment terms for goods ZZZ purchase via invoice 2003, the payment entity device 12 initiates payment on a date it selects. In this example, the payment entity device 12 was programmed to select the date on which the data is compiled, however, it could be programmed to select any date or interval from the corresponding invoice date.

In this example, the payment entity device 12 also generates payment data 152 for a loan that the client has with Supplier DEF. The loan could be a line of credit, a loan, or some other form of monetary advancement. The payment data 152 for the loan indicates that $500.00 is to be wired from Bank "A" to Supplier DEF's account on the date the data is created.

Figure 8:
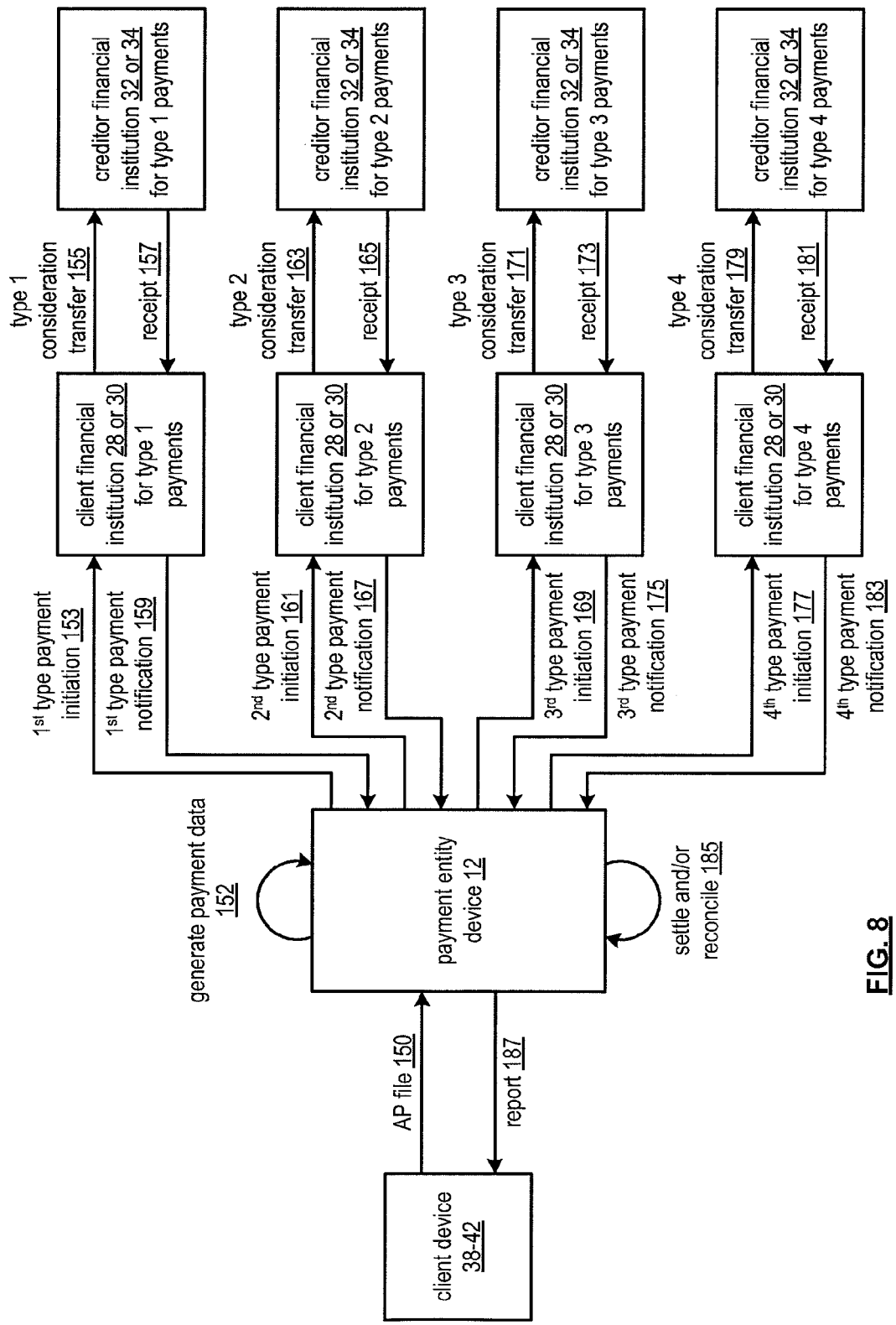
FIG. 8 is a schematic block diagram of an example of payment of accounts payable via a system in accordance with the present invention.

FIG. 8 is a schematic block diagram of an example of payment of accounts payable via the system 10 of FIG. 1. In this example, the client device 38-42 transmits an accounts payable data file 150 to the payment entity device 12. The payment entity device 12 processes the account payable data file 150 in accordance with the payables profile 140 for the client to generate the payment data 152.

The payment entity device 12 analyzes the payment data 152 on an per entry basis to determine a type of payment (e.g., credit card, funds transfer, commercial paper, tangible consideration, or debit account). When the type of payment is a first type, the payment entity device 12 transmits a $1^{st}$ type payment initiation request 153 to a client financial institution 28 or 30 that processes the $1^{st}$ type of payments. Assuming the payment is approved, the client financial institution 28 or 30 transfers the $1^{st}$ type of consideration 155 (e.g., funds transfer, check, line of credit, etc.) to a creditor financial institution 32 or 34 that processes the first type of payment. Upon crediting the $1^{st}$ type of consideration to the appropriate creditor's account, the creditor's financial institution 32 or 34 transmits a receipt of payment 157 to the client financial institution 28 or 30. The client financial institution 28 or 30 processes the receipt 157 to produce a $1^{st}$ type of payment notification 159. The client financial institution transmits the notification 159 to the payment entity device 12.

When the type of payment is a second type, the payment entity device 12 transmits a $2^{nd}$ type payment initiation request 161 to a client financial institution 28 or 30 that processes the $2^{nd}$ type of payments. Assuming the payment is approved, the client financial institution 28 or 30 transfers the $2^{nd}$ type of consideration 163 (e.g., funds transfer, check, line of credit, etc.) to a creditor financial institution 32 or 34 that processes the second type of payment. Upon crediting the $2^{nd}$ type of consideration to the appropriate creditor's account, the creditor's financial institution 32 or 34 transmits a receipt of payment 165 to the client financial institution 28 or 30. The client financial institution 28 or 30 processes the receipt 165 to produce a $2^{nd}$ type of payment notification 167. The client financial institution transmits the notification 167 to the payment entity device 12.

When the type of payment is a third type, the payment entity device 12 transmits a $3^{rd}$ type payment initiation request 169 to a client financial institution 28 or 30 that processes the $3^{rd}$ type of payments. Assuming the payment is approved, the client financial institution 28 or 30 transfers the $3^{rd}$ type of consideration 171 (e.g., funds transfer, check, line of credit, etc.) to a creditor financial institution 32 or 34 that processes the third type of payment. Upon crediting the $3^{rd}$ type of consideration 171 to the appropriate creditor's account, the creditor's financial institution 32 or 34 transmits a receipt of payment 173 to the client financial institution 28 or 30. The client financial institution 28 or 30 processes the receipt 173 to produce a $3^{rd}$ type of payment notification 175. The client financial institution transmits the notification 167 to the payment entity device 12.

When the type of payment is a fourth type, the payment entity device 12 transmits a $4^{th}$ type payment initiation request 177 to a client financial institution 28 or 30 that processes the $4^{th}$ type of payments. Assuming the payment is approved, the client financial institution 28 or 30 transfers the $4^{th}$ type of consideration 179 (e.g., funds transfer, check, line of credit, etc.) to a creditor financial institution 32 or 34 that processes the fourth type of payment. Upon crediting the $4^{th}$ type of consideration 179 to the appropriate creditor's account, the creditor's financial institution 32 or 34 transmits a receipt of payment 181 to the client financial institution 28 or 30. The client financial institution 28 or 30 processes the receipt 181 to produce a $4^{th}$ type of payment notification 183. The client financial institution transmits the notification 183 to the payment entity device 12. Note that the client financial institution that processes the first, second, third, and fourth types of payments may be the same financial institution, different institutions, or multiple financial institutions with at least one processing at least two types of payments. For example, a client may have a checking account and credit card with a first bank and having a line of credit and a debit account from a second bank.

As the payment entity device 12 receives the notifications 159, 167, 175, and/or 183, it stores them and processes 185 them to settle and reconcile the accounts payable. When this process is complete, or at any desired level of completion (e.g., on a per accounts payable basis up to all of the accounts payable in the accounts payable data file 150), the payment entity device 12 generates a report 187 regarding payment of the accounts payable and sends it to the client device 38-42. In such a system, the client sends its accounts payable information to the payment entity, which handles the payment, tracking, and reporting of paying the accounts payable with little or no further involvement of the client.

Figure 9:
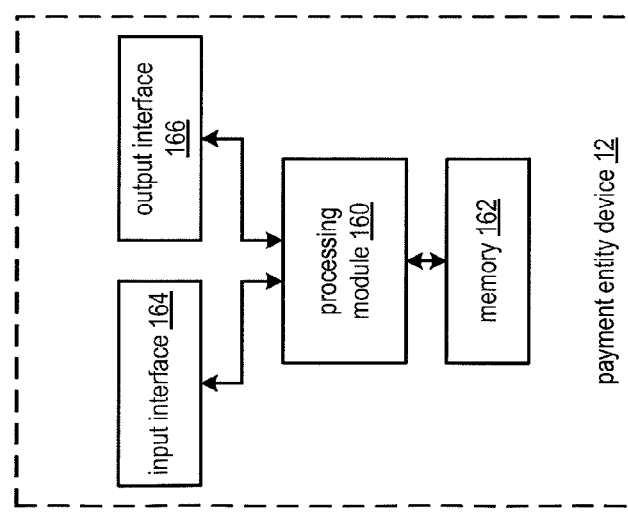
FIG. 9 is a schematic block diagram of an embodiment of a payment entity device in accordance with the present invention.

FIG. 9 is a schematic block diagram of an embodiment of a payment device 12 that includes a processing module 160, memory 162, an input interface 164, and an output interface 166. In an embodiment, the payment entity device 12 is a computer or similar processing device. In such an embodiment, the processing module 160 includes a central processing unit; the memory 162 includes system memory, cache memory, and read only memory; the input interface 164 includes a graphical user interface and/or a peripheral device interface (e.g., to connect to a mouse, a keyboard, etc.); and the output interface 166 includes a video card, printer card, etc. Note that, while not shown, the payment entity device 12 includes a network interface module such that it can access the proprietary network 16.

In general, the processing module 160 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 160 may have internal memory and/or is coupled to memory 162. Memory 162 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 162 stores, and the processing module 160 executes, hard coded and/or operational instructions corresponding to at least some of the steps and/or functions illustrated in FIGS. 1-14.

Figure 10:
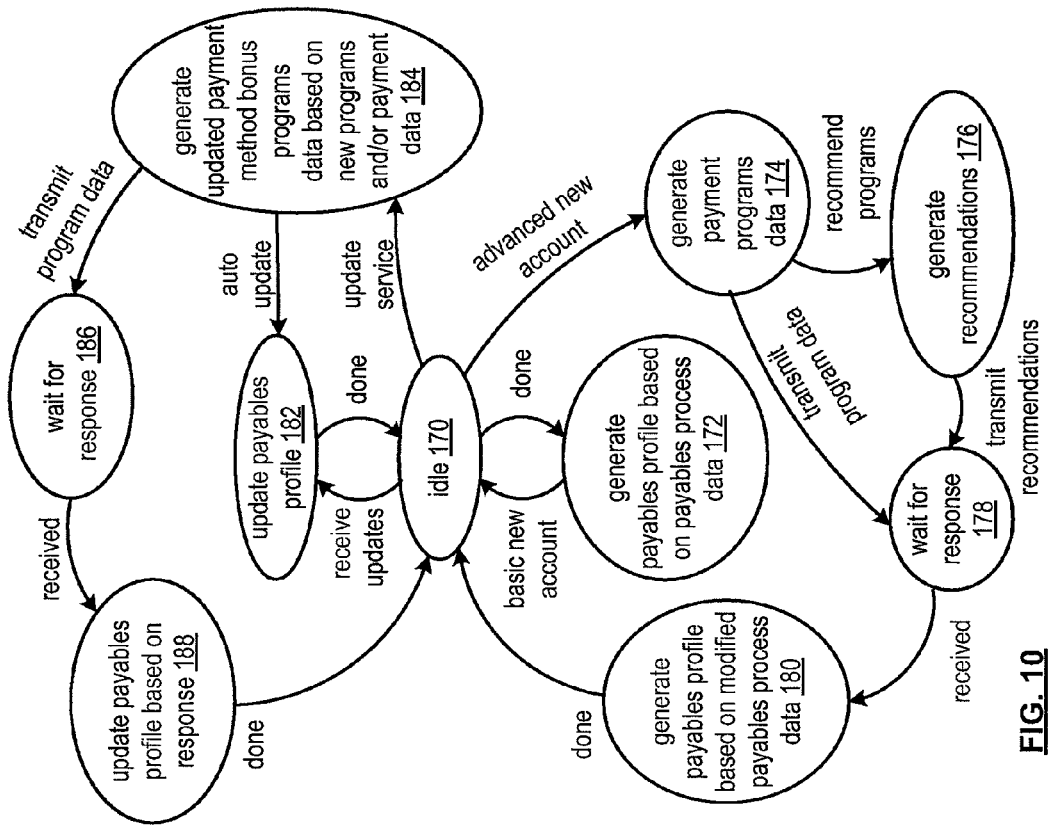
FIG. 10 is a state diagram of an embodiment of generating a payables profile in accordance with the present invention.

FIG. 10 is a state diagram of an embodiment of generating a payables profile where the payment entity device begins in an idle state 170. The payment entity device 12 transitions to a generate a payables profile based on the payables process data state 172 when it receives a request to create a new basic account for the client. In this state, the payment entity device 12 generates the payables profile based on the data provided by the client device. When the payment entity device finishes converting the payables process data into the payables profile, it returns to the idle state 170. FIG. 5 provides an example of a payables profile.

The payment entity device 12 transitions from the idle state 170 to a generate a payment programs data state 174 when it receives a request to create a new advanced account for the client. In this state 174, the payment entity determines whether it is to transmit a listing of payment programs to the client or to determine recommended payment programs for the client. Such a determination may be made based on the type of advance account selected by the client or selected by the payment entity device. The payment programs includes one or more of, but is not limited to, a list of financial institutions, the type of payments that each financial institution processes, fees for processing payments, interest rate, reward programs, rebates, etc.

When the payment entity device is to transmit the list, it transmits the list of payment programs to the client device and then transitions to a wait for response state 178. Note that the list of payment programs may be an exhaustive list of payment programs offered by a multitude of financial institutions that the payment entity device is aware of or the list may be culled down to programs offered by financial institutions of interest to the client.

When the payment entity is to recommend payment programs for the client, it transitions to generate recommendations state 176. In this state, the payment entity device 12 determines payment programs from one or more financial institutions offering optimal payment options (e.g., cost for transactions, payment terms, rewards, bonuses, interest, etc.) for the client. The initial recommendation may range from a generic recommendation to a very specific recommendation. For example, if the client provided littler or no information regarding its payment method preferences, the payment entity device will make generic recommendations as to which payment methods have more optimal payment options. If, however, the client has provided some specific information regarding its preferred payment method(s), the payment entity device can tailor the recommendations to correspond to the client's preferred payment method(s).

Once the payment entity device has generated the payment method recommendation, it transmits them and then transitions to the wait for a response state 178. When the payment entity device receives a response from the client device, the payment entity device transitions to generate a payables profile based on modified payables process data state 180. In this state 180, the payment entity device 12 generates a payables profile from the modified payment process data that was generated by the client device in light of the recommended payment programs or the list of payment program options. In this state, the term modified is used to indicate that the client had an opportunity to modify its payables process data with a payment program and not to indicate that the client actually modified the data. When the payment entity device finishes converting the modified payables process data into the payables profile, it returns to the idle state 170.

Once the client's account is established, the payment entity may update the payables profile and/or receive updates to the payables profile from the client device. When the client has subscribed for update services, the payment entity device transitions from the idle state to generate updated payment programs state 184 at periodic intervals. In this state, the payment entity device determines new, changed, and/or deleted payment programs that may be of interest to the client. For example, a financial institution may change its interest rate on a credit card, may change it reward program, etc. As another example, may create a new checking program with no services fees for balances greater than a specified amount. As yet another example, a financial institution may delete a rewards program for a credit card or checking account.

If the client's account includes automatic update services, the payment entity device transitions to the update payables profile state 182 once the updated payment program data is created. In this state 182, the payment entity device identifies individual payment process for a creditor that can be made more optimal with an updated payment program. For each of these identified payment processes, the payment entity device updates the payables profile. When this is completed, the payment entity device returns to the idle state 170.

If the client's account does not include automatic updated services, the payment entity device transmits the updated payment program data to the client device and transitions to state 186 where it waits for a response. When a response is received, the payment entity device transitions to state 188 where it updates the payables profile in accordance with the response. When this is completed, the payment entity device returns to the idle state 170. In this instance, updated payment programs are identified and sent to the client, the client has the option of picking which, if any, payment processes it wants to update.

FIG. 11 is a logic diagram of an embodiment of a method for generating and updating a payables profile that begins at step 190 where the payment entity device receives payables process data from a client device. The payables process data includes a list of creditors and associated payment data. The associated payment data includes at least one payment scheme for paying at least a portion of debt owed to a creditor via at least one of: a client credit card, a funds transfer, commercial paper, tangible consideration, and a debit account.

The method continues at step 192 where the payment entity device determines a level of service for a client associated with the client device. For example, the level of service may be basic, may be basic with auto updates, may be basic with client selected updates, may be advanced, may be advanced with auto updates or may be advanced with client selected updates. The method continues at step 194 where the payment entity device generates a payables profile for the client based on the payables process data in accordance with the level of service. The method continues at step 196 where the payment entity device updates the payables profile in accordance with the updated associated payment data.

Figure 13:
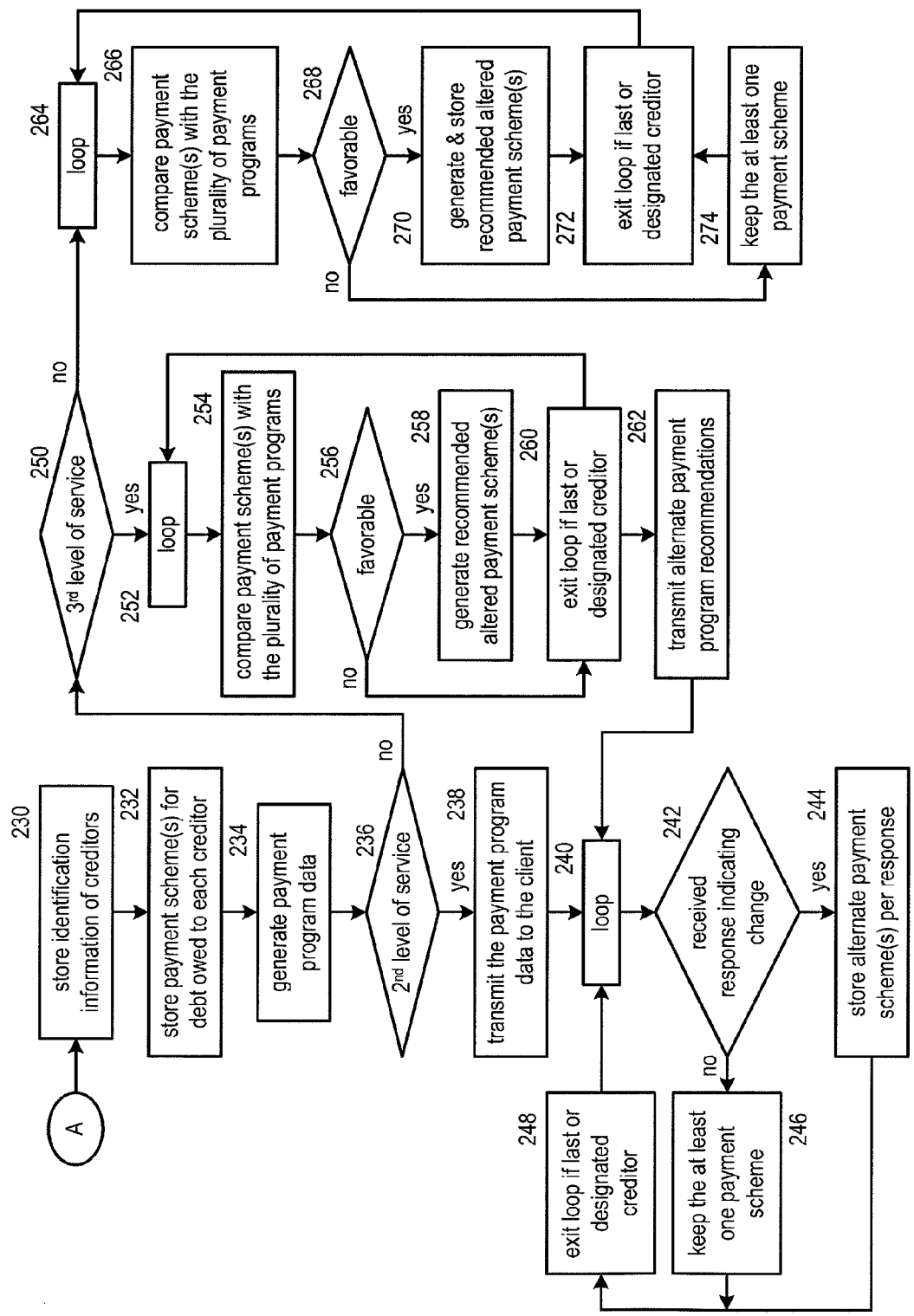

The steps of generating and updating the payables profile are further described in the embodiment of FIGS. 12 and 13. The method begins in FIG. 12 at step 200 where the payment entity device determines whether the client has subscribed to a first level of service (e.g., basic). When client has subscribed to the first level of service, the method continues at step 202 where the payment entity device enters a loop. In the loop, the payment entity device stores identification information of a creditor. The information may include one or more of, but is not limited to, the creditor's name, the creditor's address, the creditor's account information, the type of goods and/or services of the creditor, etc.

The loop then continues at step 206 where the payment entity device determines whether, for this creditor, the client's payment process data includes one or multiple payment methods. When the payment process data includes a single payment method, the method continues at step 208 where the payment entity device stores the payment scheme for the debt owed to the creditor as the associated payment data. For example, the payment process data may indicate that all debt owed to the creditor is to be paid by check, wire transfer, a debit account, or a credit card.

If, however, the payment process data includes multiple payment methods, the method continues at step 210 where the payment entity device stores a first payment scheme for a first portion of the debt owed to the creditor. In an embodiment, the first portion of the debt corresponds to at least one of: individual transactions below a value threshold, individual transactions purchased via a first purchasing mechanism, and individual transactions corresponding to a first category of services or goods. The method then continues at step 212 where the payment entity device stores a second payment scheme for a second portion of the debt owed to the creditor. In an embodiment, the second portion of the debt corresponds to at least one of: individual transactions at or above the value threshold, individual transactions purchased via a second purchasing mechanism, and individual transactions corresponding to a second category of services or goods, wherein the at least one payment scheme includes the first and second payment schemes. The method then proceeds to step 214 where the payment entity device determines whether there is another portion of the debt owed. If there is another portion, the method reverts back to step 212. For example, the payment process data may indicate that debt owed to the client that results from purchasing a certain type of goods or services is to be paid using a credit card and debt owed as a result of purchasing another type of goods or services is to be paid using a check.

The method may optionally include step 216 and/or step 218. At step 218, the payment entity device stores a shipping payment scheme for paying shipping costs as part of the associated payment data. In this instance, the client can specify paying shipping and handling costs by a different payment scheme than is used to pay for the associated goods and/or services. At step 218, the payment entity device stores a tax payment scheme for paying taxes associated with goods or services received from the creditor as part of the associated payment data. The method then continues at step 220 where the payment entity device exits the loop when a last or designated creditor is reached or repeats the loop for another creditor.

If, at step 200, the level of service is not the first level, the method continues at step 230 of FIG. 13 where the payment entity device stores the identification information of the creditors. The method continues at step 232 where the payment entity device stores payment schemes or methods for the debt owed to each creditor. This may be done as previously described in FIGS. 10 and/or 12. The method proceeds to step 234 where the payment entity device generates payment program data that, at least, includes a payment program from a financial entity. This may be done by compiling payment programs from a variety of financial institutions, where a payment program may be interest rates, payment terms, processing fees, bonuses, rewards, etc. associated with a credit card, a debit card, a debit account, a line of credit, and/or other forms of tangible consideration.

The method continues to step 236 where the payment entity device determines whether the level or service is a second level of service. When the level of service is the second level, the method continues at step 238 where the payment entity device transmits the payment program data to the client device. The method continues at step 240 where the payment entity device enters a loop.

Within the loop, the method continues at step 242 where the payment entity device determines when a response to change the payables profile is received. As an example, if the client elects to replace one or more of the payment schemes or methods for a particular creditor with one of the payment programs from the payment program data, the client would provide a response indicating the requested change. If the response is received, the method continues to step 244 where the payment entity device stores the alternate payment scheme(s) as indicated in the response. As such, the payment entity device is overwriting the payment scheme or method used by the client to pay at least a portion of the debt owed to the creditor with a new payment scheme or method.

If the response to change is not received, the method proceeds to step 246 where the payment entity device keeps the existing payment scheme for a given creditor in the payables profile. The method then proceeds to step 248 where the payment entity device exits the loop when a last or designated creditor is reached or repeats the loop for another creditor.

If, at step 236, the level of service is not the second level, the method continues at step 250 where the payment entity device determines whether the level of service is at a third level. If the level of service is the third level, the method continues at step 252 where the payment entity device enters a loop. Within the loop, the method continues at step 254 where the payment entity device compares the at least one payment scheme of a creditor with the plurality of payment programs. The method then branches at step 256 depending on whether the comparison of the payment scheme is favorable with respect to the plurality of programs. When the comparison is favorable (e.g., at least one program offers a more optimal payment method having lower interest rates, better payment terms, etc.), the method continues at step 258 where the payment entity device generates at least one recommended altered payment scheme. The method then continues at step 260 where the payment entity device exits the loop when a last or designated creditor is reached or repeats the loop for another creditor.

When the payment entity device exists the loop, the method proceeds to step 262 where the payment entity device transmits the at least one recommended altered payment scheme to the client device. The method then continues at step 240, which has been previously described.

If, at step 250, the level of service is not the third level (e.g., it is a fourth level), the method continues at step 264 where the payment entity device enters a loop. Within the loop, the method continues at step 266 where the payment entity device compares the at least one payment scheme with the plurality of payment programs. The method then branches at step 268 depending on whether the comparison of the payment scheme is favorable with respect to the plurality of programs. When the comparison is favorable, the method continues at step 270 where the payment entity device generates at least one recommended altered payment scheme (e.g., a payment program that is more optimal than the current payment scheme for at least a portion of the debt owed to a creditor). The payment entity device stores the recommended altered payment scheme, overwriting the payment scheme that was previously stored the payables profile for the creditor.

When the comparison is unfavorable, the method continues at step 274 where the payment entity device keeps the current payment scheme for at least a portion of the debt owed to the creditor. The method continues at step 272 where the payment entity device exits the loop when a last or designated creditor is reached or repeats the loop for another creditor.

Figure 14:
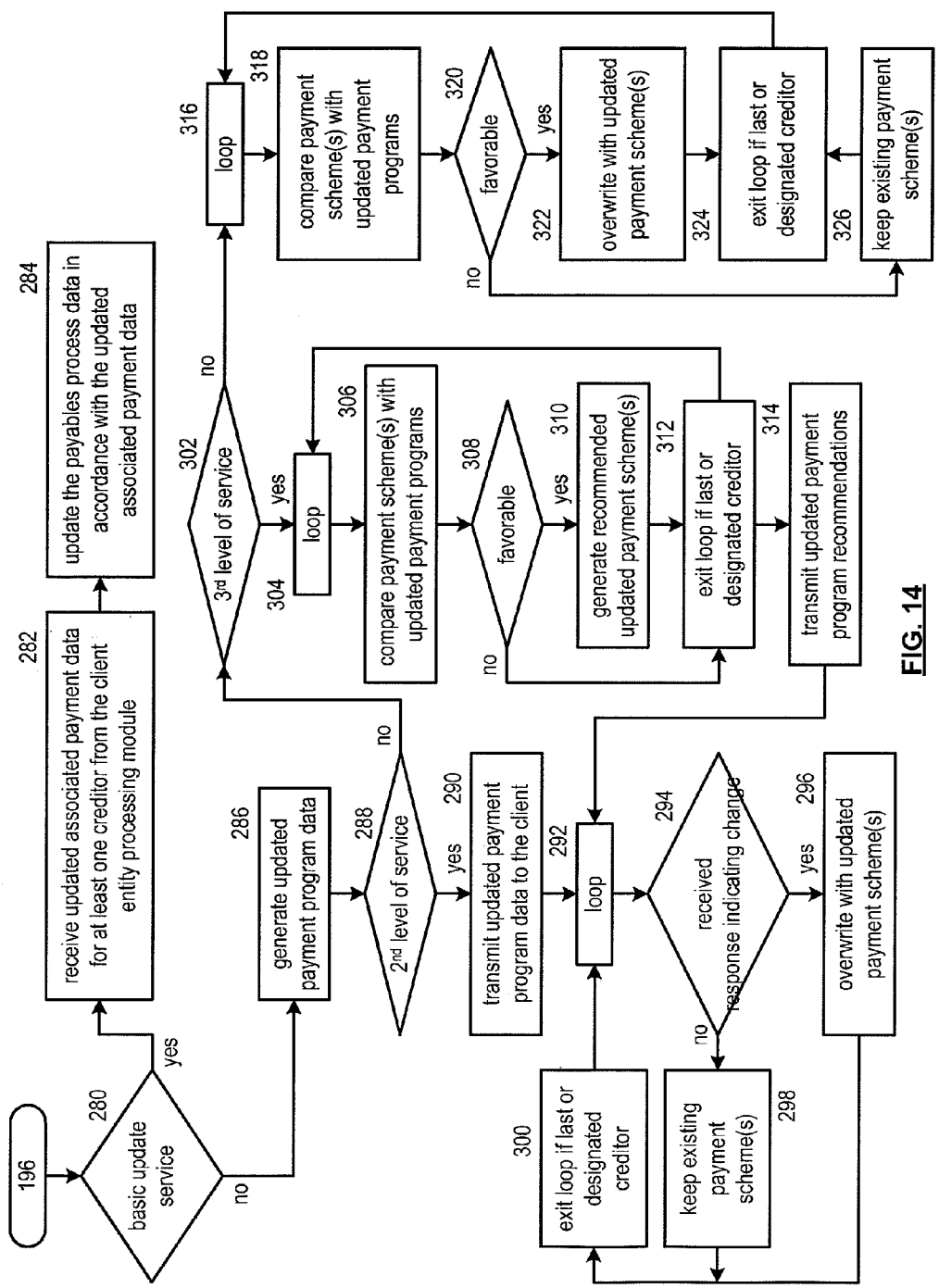
FIG. 14 is a logic diagram of an embodiment of a method for updating a payables profile in accordance with the present invention.

FIG. 14 is a logic diagram of an embodiment of a method for updating a payables profile that begins at step 280 where the payment entity device determines the level of update service. When the level of update service is a basic level, the method continues at step 282 where the payment entity device receives updated associated payment data for the creditor from the client device. In this instance, the payment entity device may have provided a list of payment programs and/or a list of recommended payment programs to the client device. The client device then selects the payment program it desires for a given creditor and generates the updated associated payment data. The method continues at step 284 where the payment entity device updates the payables profile in accordance with the updated associated payment data.

When the update service is not the basic level, the method continues at step 286 where the payment entity device generates update payment program data that, at least, includes an updated or new payment program from a financial entity. The method continues at step 288 where the payment entity device determines whether the update service level is a second level. When the update service level is the second level, the method proceeds to step 290 where the payment entity device transmits the updated payment program data to the client device. The method continues at step 292 where the payment entity device enters a loop.

Within the loop, the method continues at step 294 where the payment entity device determines whether a response to change the payables profile is received. If the response is received, the method continues to step 296 where the payment entity device overwrites the existing payment scheme with the alternate payment scheme(s) as indicated in the response. If the response to change is not received, the method proceeds to step 298 where the payment entity device keeps the existing payment scheme for a given creditor in the payables profile. The method then proceeds to step 300 where the payment entity device exits the loop when a last or designated creditor is reached or repeats the loop for another creditor.

If, at step 288, the level of service is not the second level, the method continues at step 302 where the payment entity device determines whether the level of service is at a third level. If the level of service is the third level, the method continues at step 304 where the payment entity device enters a loop. Within the loop, the method continues at step 306 where the payment entity device compares the at least one payment scheme of a creditor with the plurality of updated or new payment programs. The method then branches at step 308 depending on whether the comparison of the payment scheme is favorable with respect to the plurality of programs. When the comparison is favorable (e.g., at least one program offers a more optimal payment method having lower interest rates, better payment terms, etc.), the method continues at step 310 where the payment entity device generates at least one recommended updated or new payment scheme. The method then continues at step 312 where the payment entity device exits the loop when a last or designated creditor is reached or repeats the loop for another creditor.

When the payment entity device exists the loop, the method proceeds to step 314 where the payment entity device transmits the at least one recommended updated payment scheme to the client device. The method then continues at step 292, which has been previously described.

If, at step 302, the level of service is not the third level (e.g., it is a fourth level), the method continues at step 316 where the payment entity device enters a loop. Within the loop, the method continues at step 318 where the payment entity device compares the at least one payment scheme with the plurality of updated or new payment programs. The method then branches at step 320 depending on whether the comparison of the payment scheme is favorable with respect to the plurality of updated or new programs. When the comparison is favorable, the method continues at step 322 where the payment entity device generates at least one recommended updated payment scheme (e.g., a payment program that is more optimal than the current payment scheme for at least a portion of the debt owed to a creditor). The payment entity device overwrites the existing payment scheme in the payables profile with the recommended updated payment scheme.

When the comparison is unfavorable, the method continues at step 326 where the payment entity device keeps the current payment scheme for at least a portion of the debt owed to the creditor. The method continues at step 324 where the payment entity device exits the loop when a last or designated creditor is reached or repeats the loop for another creditor.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method performed by a computing device, the method comprising:
receiving, by the computing device, payables process data of a client that pays a plurality of creditors, wherein the payable process data includes identification information and associated payment data for the plurality of creditors, and wherein the associated payment data includes a first payment scheme corresponding to payment of a first type of debt owed to one of the plurality of creditors and a second payment scheme corresponding to payment of a second type of debt owed to the same creditor,
wherein the first type of debt includes one of: transactions at or above a value threshold, transactions corresponding to a first category of goods or services, and transactions corresponding to a second category of goods or services, and wherein the second type of debt includes a different one of: transactions at or above the value threshold, transactions corresponding to the first category of goods or services, and transactions corresponding to the second category of goods or services;

determining, by the computing device, that the client is associated with a first level of service or a second level of service; and generating, by the computing device, a payables profile of the client, wherein the payables profile is generated based on the received payables process data and the determined level of service, wherein when the determined level of service is the first level of service, generating the payables profile of the client comprises storing, by the computing device, the first and second payment schemes included in the payables process data, and wherein when the determined level of service is the second level of service, generating the payables profile of the client comprises analyzing payment program data and modifying the first or second payment scheme based on the analyzed payment program data.

2. The method of claim 1, wherein the computing device is a payment entity device configured to facilitate payment and reconciliation of accounts payable.

3. The method of claim 1, wherein the computing device is a client device operated by the client.

4. The method of claim 1, wherein the first payment scheme includes one of: a credit account, a debit account, a funds transfer, commercial paper, and monetary consideration, and wherein the second payment scheme includes a different one of: the credit account, the debit account, the funds transfer, the commercial paper, and the monetary consideration.

5. The method of claim 1, wherein the first level of service corresponds to a basic account selected by the client during an enrollment process, and wherein the second level of service corresponds to an advanced account selected by the client during the enrollment process.

6. The method of claim 1, wherein the payment program data includes a list of financial institutions and corresponding payment types processed by the financial institutions.

7. The method of claim 6, wherein the payment program data further includes one or more of: processing fees, interest rates, reward programs, and rebates associated with the payment types processed by the financial institutions.

8. The method of claim 1, wherein analyzing the payment program data comprises identifying a more optimal payment scheme, and wherein modifying the first or second payment scheme comprises replacing the first or second payment scheme with the more optimal payment scheme in the generated payables profile.

9. The method of claim 1 further comprising:
providing the more optimal payment scheme to the client as a recommendation; and
receiving a selection from the client of the more optimal payment scheme before replacing the first or second payment scheme with the more optimal payment scheme in the generated payables profile.

10. The method of claim 1, wherein the first type of debt includes transactions corresponding to a first category of goods, and wherein the second type of debt includes transactions corresponding to a secondary category of goods.

11. The method of claim 1, wherein the associated payment data includes a shipping payment scheme for paying shipping debt associated with goods received from the one of the plurality of creditors, wherein the shipping payment scheme is different than the first and second payment schemes, and wherein generating the payables profile for the client further comprises storing the shipping payment scheme.

12. The method of claim 1, wherein the associated payment data includes a tax payment scheme for paying taxes associated with goods or services received from the one of the plurality of creditors, wherein the tax payment is different than the first and second payment schemes, and wherein generating the payables profile for the client further comprises storing the tax payment scheme.

13. A computing device comprising:
a processor; and
a memory coupled to the processor, wherein the memory comprises code executable by the processor for implementing a method comprising:
receiving, by the computing device, payables process data of a client that pays a plurality of creditors, wherein the payable process data includes identification information and associated payment data for the plurality of creditors, and wherein the associated payment data includes a first payment scheme corresponding to payment of a first type of debt owed to one of the plurality of creditors and a second payment scheme corresponding to payment of a second type of debt owed to the same creditor,
wherein the first type of debt includes one of: transactions at or above a value threshold, transactions corresponding to a first category of goods or services, and transactions corresponding to a second category of goods or services, and wherein the second type of debt includes a different one of: transactions at or above the value threshold, transactions corresponding to the first category of goods or services, and transactions corresponding to the second category of goods or services;
determining, by the computing device, that the client is associated with a first level of service or a second level of service; and
generating, by the computing device, a payables profile of the client, wherein the payables profile is generated based on the received payables process data and the determined level of service,
wherein when the determined level of service is the first level of service, generating the payables profile of the client comprises storing, by the computing device, the first and second payment schemes included in the payables process data, and
wherein when the determined level of service is the second level of service, generating the payables profile of the client comprises analyzing payment program data and modifying the first or second payment scheme based on the analyzed payment program data.

14. The computing device of claim 13, wherein the computing device is a payment entity device configured to facilitate payment and reconciliation of accounts payable.

15. The computing device of claim 13, wherein the computing device is a client device operated by the client.

16. The computing device of claim 13, wherein the first payment scheme includes one of: a credit account, a debit account, a funds transfer, commercial paper, and monetary consideration, and wherein the second payment scheme includes a different one of: the credit account, the debit account, the funds transfer, the commercial paper, and the monetary consideration.

17. The computing device of claim 13, wherein the first level of service corresponds to a basic account selected by the client during an enrollment process, and wherein the second level of service corresponds to an advanced account selected by the client during the enrollment process.

18. The computing device of claim 13, wherein the payment program data includes a list of financial institutions and corresponding payment types processed by the financial institutions.

19. The computing device of claim 18, wherein the payment program data further includes one or more of: processing fees, interest rates, reward programs, and rebates associated with the payment types processed by the financial institutions.

20. The computing device of claim 13, wherein analyzing the payment program data comprises identifying a more optimal payment scheme, and wherein modifying the first or second payment scheme comprises replacing the first or second payment scheme with the more optimal payment scheme in the generated payables profile.

21. The computing device of claim 13, wherein the memory further comprises code executable by the processor for implementing a method comprising:
   providing the more optimal payment scheme to the client as a recommendation; and
   receiving a selection from the client of the more optimal payment scheme before replacing the first or second payment scheme with the more optimal payment scheme in the generated payables profile.

* * * * *